April 14, 1942.    K. E. WHITNEY    2,279,854
APPARATUS FOR MAKING ANEROIDS
Filed Jan. 2, 1941
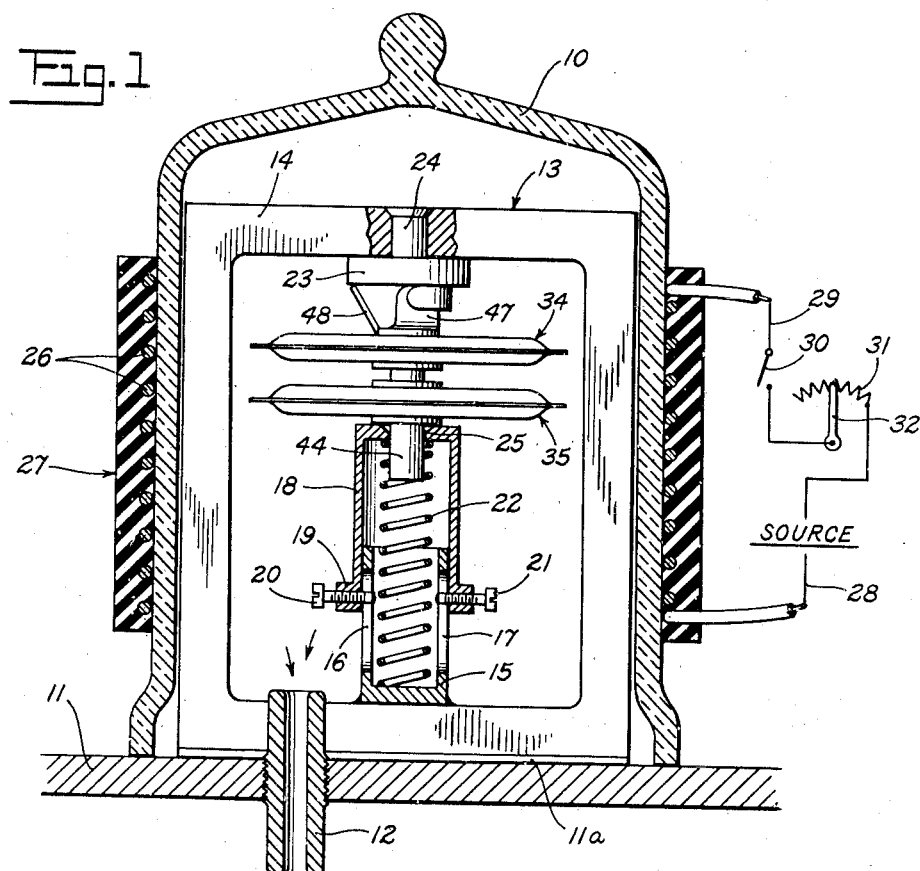
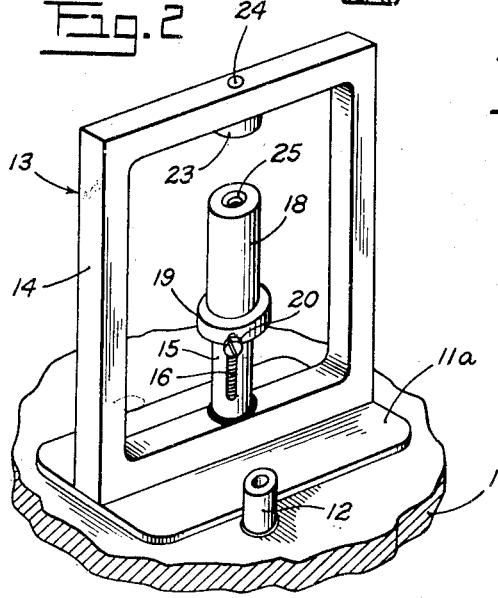
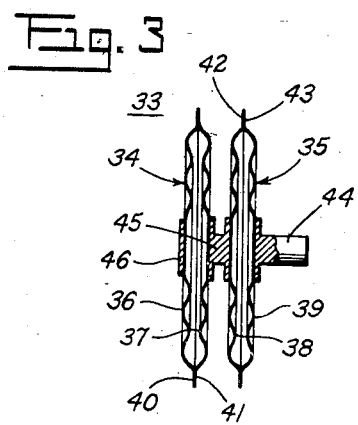
INVENTOR.
Kenneth E. Whitney
BY Cerstvik & Kalman
ATTORNEYS.

Patented Apr. 14, 1942

2,279,854

UNITED STATES PATENT OFFICE 2,279,854

APPARATUS FOR MAKING ANEROIDS

Kenneth E. Whitney, Baltimore, Md., assignor to Bendix Aviation Corporation, Bendix, N. J., a corporation of Delaware Application January 2, 1941, Serial No. 372,944

4 Claims. (Cl. 219—13)

This invention relates generally to apparatus for making pressure responsive devices and more particularly to the art of constructing sealed aneroids.

An object of the present invention is to provide a novel and improved apparatus, from that heretofore known in the art, for constructing pressure responsive devices such as aneroids.

Another object of the invention is to provide a novel apparatus for constructing and manufacturing aneroids, whereby the same are subjected to a vacuum at the interior and exterior thereof and subsequently heated thereby providing sealed evacuated capsules.

A further object of the invention is to provide a novel apparatus for constructing and manufacturing aneroids whereby, after their assembly, they are subjected to a vacuum at the interior and exterior thereof and subsequently subjected to heat, thereby causing autogenous sealing of the aneroid walls, the heating of the aneroids resulting from current flow induced in the walls thereof by a magnetic field produced by a high frequency current about the aneroids.

Another object of the invention is to provide a novel apparatus for constructing sealed aneroids whereby the assemblage and alignment thereof for sealing requires a minimum amount of work and time.

Still another object is to provide a novel apparatus for constructing aneroid units, whereby a plurality of aneroids can be assembled and interconnected individually, and evacuated and sealed as a unit simultaneously and in a substantially continuous operation without the necessity of evacuating the aneroids individually after their sealing.

The present invention further contemplates the provision of novel apparatus which is simple and inexpensive to manufacture for carrying out the method set forth herein.

Another object of the invention is to provide a novel apparatus for carrying out the herein described method of constructing aneroids, having an evacuation chamber wherein the aneroid is assembled, supported and evacuated without the application of any physical pressure thereon, or about the outer periphery thereof, and having means carried thereby for imparting heat to the aneroids whereby the latter are sealed to provide evacuated capsules.

A further object is to provide a novel apparatus for constructing an aneroid or aneroids, the apparatus constituting an evacuation chamber provided with means for mounting and aligning the aneroid or aneroids therein, and adapted to have vacuum applied thereto whereby the aneroid or aneroids is or are evacuated, and means for conducting current flow therethrough whereby the aneroid or aneroids is or are heated and autogenously sealed.

Another and additional object of the invention is to provide novel apparatus for constructing aneroids, constituting an evacuation chamber for mounting the aneroids therein, and means carried by the chamber and having high frequency current flowing therethrough whereby the aneroid walls are autogenously sealed in response to heat created in the aneroid walls due to the induced currents flowing therein by a magnetic field produced by the high frequency current.

Still a further object of the invention is to provide novel apparatus for constructing aneroids, constituting an evacuation chamber for mounting the aneroids therein, means carried by the chamber for conducting a high frequency current around said chamber, whereby the aneroid walls are autogenously sealed in response to heat created in the aneroid walls due to induced currents flowing therein by a magnetic field produced by the high frequency current, and means for varying the high frequency current in the conducting means to control the amount of heat created in the aneroid walls.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description only and is not designed as a definition of the limits of the invention, reference being had for this purpose to the appended claims.

In the drawing, wherein like reference characters refer to like parts throughout the several views, Figure 1 is a front elevation, in section, of one form of novel apparatus for carrying out the novel method of the present invention, Figure 2 is a fragmentary view, in perspective, of a portion of the apparatus of Figure 1; and, Figure 3 is a central longitudinal sectional view of the aneroid unit disclosed in Figure 1.

The novel method of the present invention for constructing and manufacturing sealed aneroids includes the steps of first connecting a center post to one of the aneroid walls in some suitable manner as, for example, by soldering or spot-welding, and tinning the peripheral edges of the walls. The steps of spot-welding of the center post and the tinning of the walls may, of course, be reversed and, further, one of the wall edges may be made to overlap the other, if desired. In the case of constructing an aneroid unit, a connecting button or post is spot-welded to connect the adjacent walls of the aneroids.

The aneroid or aneroid unit is then mounted upon a bracket or jig within a chamber adapted to be evacuated, and the corresponding aneroid walls are aligned and resiliently held in position, the holding force being insufficient to cause a complete closure between the aneroid walls so that when vacuum is applied to the chamber, the chamber together with the interior of the aneroid or aneroids are simultaneously evacuated. The walls of the aneroid do not collapse during the evacuation for the reason that the exterior and interior aneroid pressures are alike.

Subsequent to the evacuation step, a high frequency electrical current is caused to flow about the chamber, and the aneroid walls, which may be constructed of phosphor-bronze or copper beryllium, define short circuiting turns of an air-core transformer whereby current is induced to flow in the aneroid walls. The induced currents thus created cause heating of the walls, the heat being proportional to the square of the induced current times the effective resistance of the aneroid material. The amount of heat thus imparted to the aneroid walls may be controlled by varying the amount of current flow either by changing the frequency of the high frequency current or in some other manner as by limiting the input energy of an oscillatory circuit used for conveying the primary current about the aneroid walls. In the foregoing manner, the temperature at which the sealing of the walls takes place can be controlled and an optimum value of temperature maintained.

Since the above heating for causing the solder to flow is done while the air pressure is low, it is apparent that a mixture of water vapor will be removed from the aneroid and an appreciable quantity of occluded gases removed from the pores of the metal itself. A further important feature lies in that since the heat originates in the aneroid structure itself, no local high temperature spots or sealing strains will occur.

Referring now to the drawing illustrating one embodiment of the novel apparatus for carrying out the method of the invention and more particularly to Figure 1 thereof, there is shown a suitable housing or casing 10 constituting an evacuation chamber and which, in the present instant, is shown as a glass bell jar but it is to be understood, any other suitable casing of insulating material may be utilized for this purpose. The housing 10 is mounted upon a suitable support or table 11 which is provided with a conduit 12 communicating with the interior of the housing at one end and at its other end with suitable means such as a suction pump (not shown) whereby the chamber 10 may be evacuated.

Means are provided for supporting in said chamber the aneroid elements to be united and sealed. For this purpose there is mounted upon the support 11 by way of a plate 11a, which may be fastened to the support in any suitable manner, a jig or holding member 13 comprising a rectangular bracket 14 supporting at its bottom inner side a hollow cylinder 15 having longitudinal slots 16 and 17 formed therein. Telescopically mounted for sliding movement on the cylinder 15 is a larger cylinder 18 having a flange 19 formed adjacent its open end, the flange being drilled at points 180° apart to receive therein screws 20 and 21 for a purpose to presently appear. Interposed between the closed end of cylinder 15 and the closed end of cylinder 18 is a coiled spring 22 which urges the two cylinders apart up to the limit stop afforded by the screws 20 and 21 engaging the upper ends of slots 16 and 17.

A cylindrical button 23 is carried by the upper inner side of bracket 14 by way of a pin 24, and the center thereof is in alignment with the center of a flared aperture 25 formed in the closed end of cylinder 18.

In accordance with the invention, means are now provided for heating the aneroid elements while under a vacuum in the evacuation chamber 10, and, as shown, surrounding the outside of chamber 10 is a high frequency coil 26 suitably insulated and encased in molded sulphur 27, said coil being electrically connected by way of leads 28 and 29 to a suitable source of high frequency current (not shown). A switch 30 is provided in the circuit for opening and closing the latter, and a suitable rheostat 31 in series therewith is provided with a contact arm 32, whereby the amount of current flowing through the coil 26 may be variably controlled. The molded sulphur 27 surrounding conductors 26 defines a desirable high frequency insulator which further serves to maintain spacing of the conductor turns and to prevent burns from high frequency arcs to the operator.

The aneroid unit 33 to be evacuated and sealed within the chamber 10 is better shown in Figure 3 as constituting two aneroids 34 and 35, each one of which comprises two elastic dish-shaped members or walls 36, 37 and 38, 39 of suitable material such as phosphor-bronze or copper beryllium, which are provided with outer flanges 40, 41 and 42, 43.

The flanges 40, 41 and 42, 43 are first tinned and the wall 39 of aneroid 35 has spot-welded or soldered thereto a center-post 44. The adjacent walls 37 and 38 of aneroids 34 and 35 are interconnected by way of a post 45 which likewise is spot-welded at both ends to the walls 37 and 38. Wall 36 of aneroid 34 may have spot-welded thereto a button 46 or if a hollow stem is desired for mounting the aneroid unit upon a solid stem within an instrument casing the clamping structure of Figure 1 may be provided. The latter comprises a clip 47 which is adapted to partially surround the solid mounting stem and a holding member 48 diagonally opposite to the clip, which may be pressed upwardly and inwardly to surround the solid stem at a point opposite to clip 47 thereby supporting the aneroid unit upon the solid stem. The clamping structure above described when used may be formed integrally with the button 46 and spot-welded to the wall 36. In the alternative, and if so desired, the clamping structure may be replaced by a second center-post on wall 36 similar to center-post 44.

In assembling the unit within the chamber 10 upon the jig 13, the wall 39 of aneroid 35 is mounted upon the closed end of cylinder 18 and has its center-post 44 passing through the aperture 25 of the latter cylinder to properly support aneroid wall 39. Wall 38 together with wall 37 connected thereto by way of post 45 is mounted within chamber 10 so that the flange 42 of wall 38 directly rests on and aligns with flange 43 of wall 39. Wall 36 is thereafter aligned with wall 37 by having its flange 40 resting directly upon flange 41 of wall 37. The clamping structure including clip 47 and member 48 adjoins cylindrical button 23 and serves the additional function of properly aligning the aneroids in that when member 48 is pressed inwardly toward clip 47 its top surface together with the top surface of clip 47 defines a plane parallel to the plane defined by button 23. Where but one aneroid is to be constructed it is obvious that substantially the same procedure will be followed as outlined above.

The amount of holding pressure exerted upon the aneroids is determined by the pressure of spring 22, the size and strength of which are so selected that the holding pressure thus exerted is insufficient to completely seal the interior of the aneroids from the interior of chamber 10.

Chamber 10 is evacuated by applying suction to the conduit 12 and, in this manner, the interior of the aneroids as well as the exterior thereof is evacuated.

Switch 30 is now closed to close the circuit whereby high frequency currents are caused to flow through conducting members 26 and because of such flow, a high frequency electromagnetic field is produced by which currents are induced in the walls 36, 37 and 38, 39 of the aneroid unit. The resistance provided by the walls to the heavy current flowing therein produces heat which is sufficient to melt the solder provided on the flanges 40, 41 and 42, 43 of the walls to cause sealing of the corresponding walls. The amount of heat to be created for this purpose may be determined, as heretofore pointed out, by adjusting arm 32 over rheostat 31, to control the amount of current flowing through the conducting members 26. The autogenous sealing of the walls occurs when the switch 30 is opened, permitting the solder to cool.

If it is desired to accelerate the cooling of the aneroid unit, the bracket 14 may be either drilled to receive or have mounted thereon a conduit through which cold water may be circulated in the well known manner, thus rapidly dissipating the heat within chamber 10. After cooling, air is allowed to flow into the housing 10 which may then be removed and the aneroid unit taken out from the jig 13. As soon as atmospheric pressure surrounds the unit the walls of the aneroid or respective aneroids will collapse toward each other since the pressure at the exterior thereof now exceeds the pressure at the interior thereof.

It will now become readily apparent to those skilled in the art that a novel method and apparatus for carrying out the method have been provided for inexpensively constructing and manufacturing pressure responsive members, such as evacuated aneroids, having no working strains and having completely dissipated therefrom any moisture or occluded gases previously present therein.

Although only one embodiment of the invention has been illustrated and described in detail, it is to be expressly understood that the invention is not limited thereto. Various changes may also be made in the steps of the method and the design and arrangement of the parts of the apparatus for carrying out the method without departing from the spirit and scope of the invention, as the same will now be understood by those skilled in the art. For a definition of the limits of the invention reference will be had primarily to the appended claims.

What is claimed is:

1. A device for constructing aneroids, comprising an evacuation chamber, bracket means rigidly mounted within said chamber, means carried by said bracket means including an adjustable member for supporting and aligning a plurality of aneroid walls within said chamber, means communicating with the chamber for creating a vacuum therein, and means coiled about said chamber for conducting alternating current around said chamber, whereby currents are induced in the walls of the aneroids to heat the same in accordance with the current flow in said conducting means.

2. A device for constructing aneroids, comprising an evacuation chamber, bracket means rigidly mounted within said chamber, means carried by said bracket means including a pair of normally yieldably extended telescopic members for supporting and aligning a plurality of aneroid walls within said chamber, means communicating with the chamber for creating a vacuum therein, and means surrounding said chamber for conducting alternating current about said chamber, whereby currents are induced in the walls of the aneroids to heat the same in accordance with the current flow in said conducting means.

3. A device for constructing aneroids comprising an evacuation chamber, substantially rectangular bracket means mounted within said chamber, a hollow cylinder mounted on said bracket means, a second hollow cylinder sleeved about said first cylinder for supporting and aligning a plurality of corresponding aneroid walls within said chamber, resilient means normally urging said second cylinder outwardly relative to said first cylinder thereby exerting a slight pressure on the edges of said walls, means communicating with said chamber for creating a vacuum therein, and means surrounding said chamber for conducting alternating current about said chamber, whereby currents are induced in the walls of the aneroids to heat the same in accordance with the current flow in said conducting means.

4. A device for constructing aneroids comprising an evacuation chamber, bracket means mounted within said chamber, a hollow member mounted on said bracket means, a second hollow member telescoping said first member for supporting and aligning a plurality of corresponding aneroid walls within said chamber, means normally yieldably urging said second member outwardly relative to said first member thereby exerting a slight pressure on the edges of said walls, means communicating with said chamber for creating a vacuum therein, and means surrounding said chamber for conducting alternating current about said chamber, whereby currents are induced in the walls of the aneroids to heat the same in accordance with the current flow induced in said conducting means.

KENNETH E. WHITNEY.